(12) United States Patent
Keyser

(10) Patent No.: US 12,011,744 B1
(45) Date of Patent: Jun. 18, 2024

(54) BIOFOULING REMOVAL TOOL

(71) Applicant: Lucan Keyser, Naples, FL (US)

(72) Inventor: Lucan Keyser, Naples, FL (US)

( * ) Notice: Subject to any disclaimer, the term of this patent is extended or adjusted under 35 U.S.C. 154(b) by 0 days.

(21) Appl. No.: 18/160,102

(22) Filed: Jan. 26, 2023

(51) Int. Cl.
*B08B 1/16* (2024.01)
*A01K 61/70* (2017.01)
*B08B 9/023* (2006.01)

(52) U.S. Cl.
CPC .............. *B08B 1/165* (2024.01); *A01K 61/70* (2017.01); *B08B 9/023* (2013.01); *B08B 2209/02* (2013.01)

(58) Field of Classification Search
CPC ..... B08B 1/005; B08B 9/023; B08B 2209/02; A01K 61/70
See application file for complete search history.

(56) References Cited

U.S. PATENT DOCUMENTS

| | | | | |
|---|---|---|---|---|
| 3,719,993 | A * | 3/1973 | Caprioli | B23D 79/08 15/104.04 |
| 4,649,849 | A * | 3/1987 | McCormick | B63B 59/06 15/104.04 |
| 5,956,788 | A * | 9/1999 | Henke | B44D 3/164 7/105 |
| 8,214,964 | B1 * | 7/2012 | Coleman | A47L 13/022 114/221 R |
| 11,090,690 | B1 * | 8/2021 | Rotanelli | B25G 3/18 |
| 2010/0162504 | A1 * | 7/2010 | Shaffer | B63B 59/00 15/105 |
| 2014/0338699 | A1 * | 11/2014 | Bassett | G01V 1/3808 134/6 |

FOREIGN PATENT DOCUMENTS

| WO | WO-2009094358 A1 * | 7/2009 | ............... E02D 5/60 |
| WO | WO-2015189692 A2 * | 12/2015 | ............. B08B 1/002 |

* cited by examiner

*Primary Examiner* — Sharidan Carrillo
(74) *Attorney, Agent, or Firm* — Wilmer Cutler Pickering Hale and Dorr LLP

(57) ABSTRACT

Methods, systems, and apparatus for a biofouling removal tool. The tool can include a body having a top surface, a bottom surface, and multiple sections. The tool can also include a plurality of recesses formed in the body. In some implementations, the plurality of recesses include a first set of one or more recesses formed in a first section of the body of the tool and a second set of one or more recesses formed in a second section of the body tool. At least one of the plurality of recesses spans a height of the body. Each of the plurality of recesses is configured to accept an outer surface of a cylindrical object. Each of the plurality of recesses includes one or more edges configured to scrape an outer surface of a cylindrical object.

10 Claims, 7 Drawing Sheets

BIOFOULING REMOVAL TOOL

TECHNICAL FIELD

The present specification relates to hand-held tools.

BACKGROUND

Corals and coral reefs play a vital role in the ecosystem of oceans and coastlines. Coral reefs are a key source of biodiversity in the ocean, housing 25 percent of marine species despite covering only 1 percent of the ocean floor. Coral reefs also protect coastlines from erosion and storm surges by acting as a barrier to reduce tidal flow. However, many coral species are threatened or endangered, and coral reefs are vulnerable to ocean warming, ocean acidification, disease, pollution, sedimentation, or damage from ships or tourists. Corals have dramatically decreased over the last several decades, and recent estimates have suggested that up to 90 percent of the world's corals may disappear within the next 30 years.

In recent years, researchers and conservationists have devised strategies to grow corals in more hospitable locations. Such strategies typically involve growing coral fragments which have either been broken off from reefs by fish or ships, intentionally removed from reefs, or obtained from spawning corals in conservation research facilities. Researchers and conservationists take these coral fragments, allow the coral fragments to grow on specialized structures, and then transplant, or "outplant," them onto existing or degrading coral reefs. These coral "nurseries" that grow corals may be land-based (ex situ) or field-based (in situ). Land-based nurseries grow corals in specialized facilities or laboratories, whereas field-based nurseries grow corals offshore.

Each form of nursery requires specialized structures in which the growing corals may be placed. One structure common to field-based nurseries is called a "coral tree." Coral trees are commonly constructed using polyvinylchloride ("PVC") pipes, with one large PVC pipe forming a central axis, or trunk, and multiple smaller PVC pipes branching from the trunk at various heights. The coral trees may also be constructed from other materials, and a common alternative material for the coral tree branches is fiberglass rods. Coral fragments may then be hung from the coral tree branches by monofilament lines. These coral trees are typically tethered to the seabed with anchors and buoyed with floats from above. Although coral trees do not necessarily have a set size, they may be sized to hold 100 coral fragments or more each. These coral trees offer multiple advantages for coral growth. First, because the coral fragments are grown above the ocean floor, they have a lower risk of death from sedimentation or predation by ocean floor-dwelling marine species. Second, the coral trees allow sunlight and flowing ocean water, both of which promote coral growth. Third, because the coral trees float freely in the water, they dissipate wave energy, thereby mitigating physical damage to the corals from waves. In addition, coral trees allow placement of the coral fragments in a portion of the water column with preferred temperature to facility coral growth. The placement of the coral trees can also be adjusted over time to keep the coral fragments in the ideal temperature range.

However, coral trees are susceptible to "biofouling," or the gradual accumulation of waterborne organisms including algae, protozoa, bacteria, and larger organisms such as barnacles, fire coral, oysters, sponges, or hydroids on wetted or underwater surfaces such as pipes or rods. These organisms may compete with the coral fragments for resources, which hinders the coral fragments' growth. The mass of these organisms may also weigh down the coral trees, causing them to descend below optimal water depth for sunlight, temperature, and current. In severe cases, the coral trees may impact with the ocean floor, leaving the coral fragments vulnerable to sedimentation and undissipated wave energy. If biofouling is left unchecked, the coral fragments may die as a result of one or more of these deleterious effects. Because biofouling can accumulate within short periods of time, coral trees must be regularly cleaned by divers.

The standard method of cleaning these coral trees involves using either a chisel or a brush. However, each of these methods suffer from inefficiencies because the tools used are not suited for the shapes and sizes of the pipes and monofilament lines that make up coral trees, nor are they suited for underwater environments. A chisel can produce sufficient force to effectively remove most forms of biofouling, but it can only cover small areas with each stroke. Alternatively, brushes may cover larger areas, but they may not produce sufficient force to effectively remove the biofouling, and they are not suited to cleaning monofilament lines. And neither of these tools are designed to be used for extended periods entirely underwater. These inefficiencies in cleaning are compounded by the regularity with which the coral trees must be cleaned and the fact that nurseries may contain hundreds of coral trees. As a result of these factors, significant manpower is devoted to cleaning the coral trees. Organizations maintaining coral trees sometimes seek out volunteer divers to assist in cleaning, but such lay volunteers must be supervised and are often not able to effectively clean the coral trees with the tools given. As a result, these organizations must devote additional time or expenses to complete the regular cleaning process.

There is a need for a cleaning tool well-equipped to efficiently clean and remove biofouling from underwater coral trees or similar structures.

SUMMARY

A tool for cleaning underwater structures is described herein. In some implementations, the tool has a body that includes plurality of recesses formed in the body and positioned along at least one of a length and a width of the tool. These recesses can include different size recesses designed to, for example, clean different types of underwater structures or different portions of the same type of underwater structure. For example, after identifying biofouling on an underwater structure, the user of the tool can locate a recess on the tool having a size capable of receiving an outer surface of the underwater structure, orient the tool to place part of the outer surface of the structure into the located recess, and drag the tool along the outer surface of the structure while keeping part of the structure in the recess to remove biofouling formed on the outer surface of the structure. The user may need to repeat the process one or more times to remove all or substantially all of the biofouling formed on the outer surface of the structure.

In some implementations, the plurality of recesses are sized and shaped to accept an outer surface of a cylindrical object. For example, at least one of the plurality of recesses can be a semicircular recess sized and shaped to accept an outer surface of a pipe or a rod that is part of a coral tree.

In some implementations, at least one of the plurality of recesses is a slot configured to accept and clean lines. For example, a recess can be a V-shaped slot that is sized and shaped to accept an outer surface of a monofilament line, a multifilament line, or a string.

In some implementations, the plurality of recesses include edges configured to scrape the outside of the cylindrical objects that they receive. For example, a recess configured to clean coral tree trunks can include an upper edge where the recess meets a top surface of the body of the tool and a bottom edge where the recess meets a bottom surface of the body of the tool. A diver can place the top or bottom edge of the recess against the outer surface of the trunk of the coral tree having biofouling growth and, with pressure, scrape the edge of the recess against the trunk to remove at least some of the biofouling growth. The recesses can have smooth edges (e.g., better suited for removing a first type of biofouling), course edges (e.g., better suited for removing a second type of biofouling), or a combination of smooth and course edges.

In some implementations, at least two of the plurality of recesses are different sizes. For example, the tool can have a recess of a first size that is configured to clean trunks of coral trees and a recess of a second size that is configured to clean branches of coral trees, where the trunks of the coral trees have a larger diameter than the branches of the coral trees.

In some implementations, the body of the tool includes multiple sections. For example, the body of the tool can include a tail section containing a plurality of recesses, a middle section that forms a hand hold for a user of the tool, and a head section opposite the tail section that contains a plurality of recesses. In more detail, the head section can include a single large recess and multiple smaller recesses. The large recess may be larger than any of the other recesses formed in the body of the tool and be oriented such that it is located opposite the tail section and oriented perpendicular to an axis that runs the length of the tool through each of the sections of the tool.

In some implementations, the recesses of the tool are shaped to accept a cylindrical object. For example, one or more of the recesses of the tool can be semicircular or semicylindrical shaped, or substantially semicircular or semicylindrical shaped and sized to accept an outer surface of a pipe or a rod. These recesses can have radii that indicate the sizes of those recesses. As another example, one or more of the recesses are slot shaped and sized to accept an outer surface of a monofilament line, a multifilament line, or a string.

In some implementations, the recesses of the tool include edges configured to scrape an outer surface of an object. For example, each of the recesses of the tool or a subset of the recesses of the tool can be configured to scrape biofouling off the outer surfaces of an underwater structure. The edge may be formed naturally using, for example, precise manufacturing techniques (e.g., laser cutting or CNC machine) or may be formed after initial manufacturing by sharpening (e.g., sanding, filing, etc.) or making course (e.g., abrasive blasting, etc.) portions of the tool where the recesses are located. In some implementations, at least one of the edges are smooth. In some implementations, at least one of the edges are coarse.

In some implementations, at least two of the plurality of recesses of the tool are different sizes. For example, the tool can have a first semicircular recess located in a head section of the tool having a radius larger than the radius of a second semicircular recess located in a tail section of the tool.

In some implementations, the tool includes multiple recesses of the same size. For example, the tool can include two or more recesses of the same size and shaped that are configured to accept and clean the same size pipe. Including multiple recesses of the same size provides a number of benefits, including, for example, extending the life of the tool. In more detail, if a first recess of a first size of the tool is worn down to the point where it is unable to efficiently clean a particular sized or type of pipe, the user can switch to using a second recess of the tool having the same or substantially the same first size and could continue to efficiently clean the particular sized or type of pipe. Having multiple recesses of the same size also allows the user to position the tool in a variety of ways to clean different sides of an object without having to reposition themself in the water. For example, the tool can be used by a diver to clean the top of an outer surface of a pipe with a recess located on a first side of the tool. Then the tool can be used to clean the bottom of the outer surface of the same pipe by simply switching to another recess located on an opposite side of the tool without the diver needing to reposition themself in the water, which can be difficult and waste time. Additionally, multiple recesses of the same size located at different positions on the tool gives users certain benefits. For example, depending on the amount of coral growth around the cleaning spot, a user may be able to use a first recess farther out on a tail section of the tool to reach areas otherwise obstructed by coral. If, however, the user needed to apply more pressure to the surface (e.g., to remove fire coral or other difficult to remove biofouling), the user can use a second recess of the same or substantially the same size that is positioned on the tool closer to the handle.

In some implementations, the tool is formed from a single material such that the tool has a uniform or substantially uniform density. For example, the entire tool can be made from a metal such as aluminum or a metal alloy such as steel. As another example, the entire tool can be made from carbon fiber, a polycarbonate, or a high-strength polymer such as polyamideimide or polyetherimide.

In some implementations, the tool is manufactured using subtractive manufacturing techniques. For example, the tool can be manufactured by laser cutting, plasma cutting, or water jet cutting the shape of the tool from sheets of material. As another example, the tool can be manufactured using a multi-axis CNC machine.

In some implementations, the tool is manufactured using additive manufacturing. For example, the tool can be made from a thermoplastic using a 3D printer.

A number of benefits are realized by creating the tool from a single material using the techniques described herein, such as subtractive manufacturing techniques. For example, creating the tool from a single material using laser cutting or other subtractive manufacturing can significantly reduce manufacturing complexity. As a result, manufacturing errors are reduced and tool consistency is improved, leading to improved and more reliable tool performance and improved user experiences.

In one general aspect, a tool for cleaning underwater structures, includes: a body having a top surface, a bottom surface, and multiple sections, the multiple sections including a first section and a second section positioned opposite the first section; a plurality of recesses formed in the body, the plurality of recesses including a first set of one or more recesses formed in the first section of the body and a second set of one or more recesses formed in the second section of the body; where at least one of the plurality of recesses spans a height of the body from the top surface of the body to the bottom surface of the body; where each of the plurality of recesses is configured to accept an outer surface of a cylindrical object; and where each of the plurality of recesses includes one or more edges configured to scrape an outer surface of a cylindrical object.

Implementations include one or more of the following features. For example, in some implementations, the multiple sections include a third section positioned between the first section and the second section.

In some implementations, the third section is shaped such that a width of the third section is greater at one or more locations along a length of the third section between where the third section meets the first section and where the third section meets the second section than (i) a width of the third section where the third section meets the first section and (ii) a width of the third section where the third section meets the second section.

In some implementations, the third section of the body (i) forms a handle or (ii) is connected to a handle.

In some implementations, at least one of the plurality of recesses is a recess that is semicircular shaped and sized to accept an outer surface of a pipe or a rod.

In some implementations, the recess is sized such that the recess has a radius greater than a radius of the pipe or rod.

In some implementations, at least one of the plurality of recesses is a slot that is sized and shaped to accept an outer surface of a monofilament line, a multifilament line, or a string.

In some implementations, each of the plurality of recesses includes at least one of a smooth edge or a course edge.

In some implementations, the smooth edge is configured to remove a first type of biofouling from a coral tree, and the course edge is configured to remove a second type of biofouling from a coral tree, where the first type of biofouling is different from the second type of biofouling.

In some implementations, each of the plurality of recesses includes a first edge formed where the corresponding recess meets the top surface of the body, and second edge formed where the corresponding recess meets the bottom surface of the body.

In some implementations, for each of the plurality of edges: the first edge is a smooth edge and the second edge is course edge; or the first edge is a course edge and the second edge is a smooth edge, where the smooth edge is configured for removing a first type of biofouling from a coral tree, and the course edge is configured for remove a second type of biofouling from a coral tree, and where the first type of biofouling is different from the second type of biofouling.

In some implementations, the first set of one or more recesses includes a first recess that has a semicircular shape and a first size; and the second set of one or more recesses includes a second recess that has a semicircular shape and a second size, where the second size is smaller than the first size.

In some implementations, the second set of one or more recesses includes a third recess that has a semicircular shape and a third size, where the third size is smaller than the first size and the second size.

In some implementations, the second recess is positioned on a first side of the second section; the third recess is positioned on a second side of the second section that is opposite the first side; and the second recess and the third recess face away from each other.

In some implementations, the second set of one or more recesses includes a fourth recess that has a semicircular shape and a size that is smaller than the first size; the first recess is located on a first end of the body and the fourth recess is located on a second end of the body opposite the first end; and the first recess and the fourth recess face away from each other.

In some implementations, a length of the body is greater than a width of the body, and the width of the body is greater than a height of the body.

In some implementations, the body is made from a single material having a uniform or substantially uniform density.

In some implementations, the height of the body is uniform or substantially uniform throughout the body.

In one general aspect, an apparatus for cleaning underwater structures, includes a body, the body includes a plurality of recesses positioned along at least one of a length and a width of the body, where the plurality of recesses span a height of the body; where the plurality of recesses are sized and shaped to accept an outer surface of a cylindrical object; and where the plurality of recesses comprise edges configured to scrape the outside surface of the cylindrical object.

In one general aspect, a process for using a tool to clean an outer surface of a cylindrical object includes selecting a tool configured to clean cylindrical objects, the tool includes: a body; a plurality of recesses formed in the body and positioned along at least one of a length and a width of the body, where: at least one of the plurality of recesses spans a height of the body; the plurality of recesses are sized and shaped to accept outer surfaces of the cylindrical objects; and the plurality of recesses comprise edges configured to scrape outer surfaces of the cylindrical objects; cleaning the outer surface of the cylindrical object while the cylindrical object and the tool are substantially or entirely underwater, where cleaning the outer surface includes: selecting a cylindrical object to clean with the tool; identifying one of the plurality of recesses of the tool that is sized and shaped to accept the outer surface of the cylindrical object; positioning the tool to place a portion of the outer surface of the cylindrical object into the identified recess; and scraping the outer surface of the cylindrical object with an edge of the recess to remove an amount of biofouling that accumulated on the outer surface of the cylindrical object.

Implementations include one or more of the following features. For example, in some implementations, the cylindrical object is a pipe or a rod; and the recess is a semicircular shaped recess.

In some implementations, the cylindrical object is a monofilament line, a multifilament line, or a string; and the recess is a slot.

In some implementations, cleaning the outer surface of the cylindrical object while the cylindrical object and the tool are substantially or entirely underwater includes cleaning, with a semicircular recess of the tool, a pipe or a rod; and cleaning, with a slot of the tool, a monofilament line.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
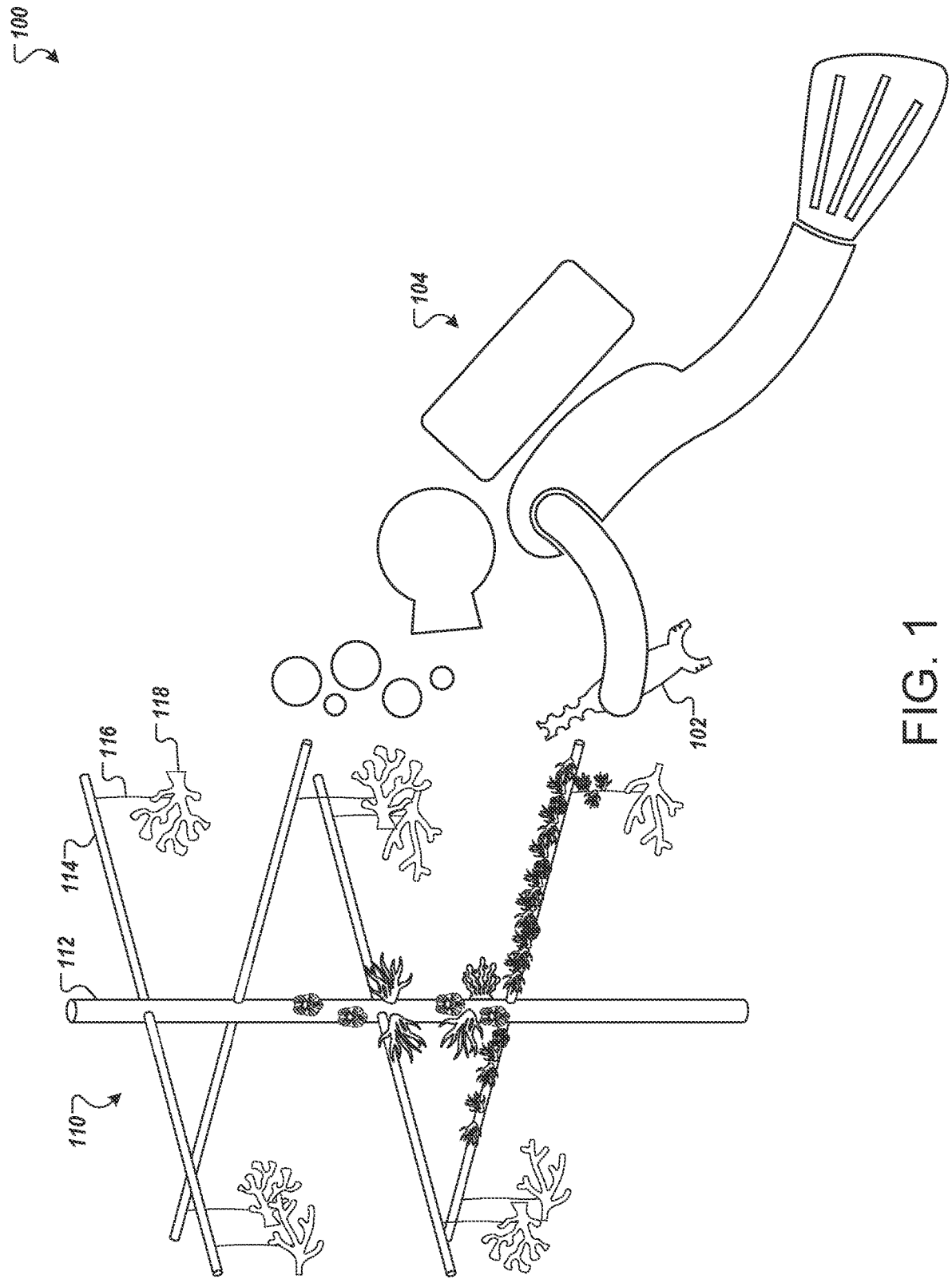
FIG. 1 is a diagram showing use of an example tool for removing biofouling.

FIG. 1 is a diagram showing use of an example tool 102 for removing biofouling. Biofouling can include, for example, algae, protozoa, bacteria, barnacles, fire coral, oysters, sponges, or hydroids that may hinder the growth and development of coral. As shown, a large amount of biofouling has built up on the bottom layer of a coral tree 110. The coral tree 110 includes a trunk 112 running vertically and a number of branches 116 that intersect the trunk 112 and that are substantially perpendicular to the trunk 112. As an example, the trunk 112 can be a PVC pipe and the branches 114 can be fiberglass rods. The coral tree 110 also includes multiple pieces of coral 118 held by lines 116 (e.g., monofilament lines, multifilament lines, or strings). Each of the lines 116 includes a first end connected to one of the branches 114 and a second end connected to one of the pieces of coral 118.

As shown in FIG. 1, a user 104 is scuba diving down to the coral tree 110 to clean the coral tree 110 using the biofouling removal tool 102. As will be described in more detail below with respect to FIGS. 2A-2B and FIG. 3, the user 104 has oriented the tool 102 in such a way as to use a particular recess of the tool 102 that is sized and shaped to accept one of the rods 114. The diver 104 can proceed to clean the coral tree 110 by placing a portion of the rod to be cleaned into the particular recess of the tool 102 and, then, dragging the tool along the rod to scrape off biofouling formed on the outer surface of the rod using the edge of the recess.

Figure 2A:
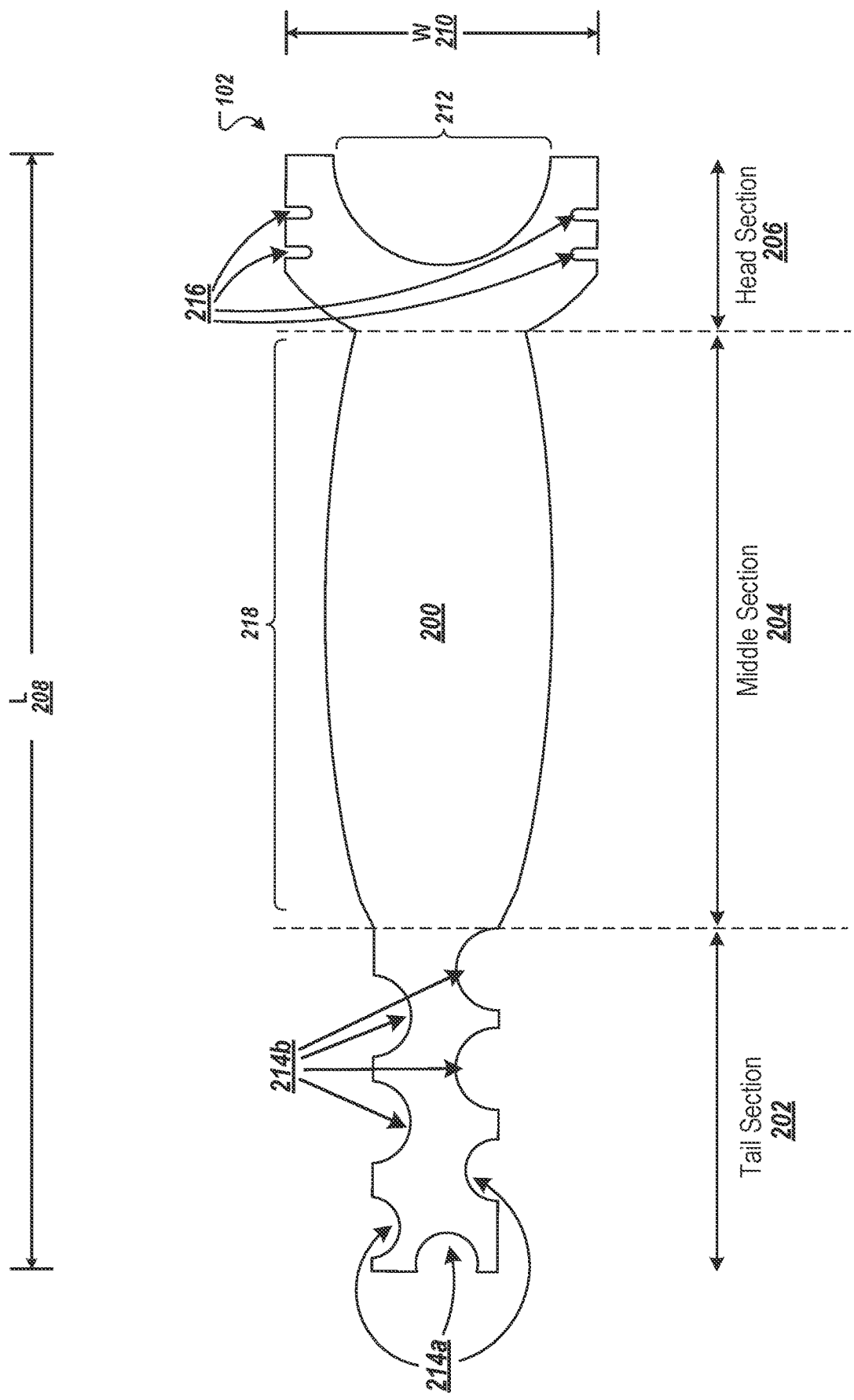
FIG. 2A is a top view of the example tool for removing biofouling.

FIG. 2A is a top view of the example tool 102 for removing biofouling. The biofouling removal tool 102 includes a body 200 and a plurality of recesses 212, 214a-214b, and 216 formed in the body 200. These recesses can include semicircular or semicylindrical shaped recesses ("semicircular recesses"), such as recesses 212 and 214a-214b, or slots, as in recesses 216. The body 200 has a length (L) 208 and a width (W) 210 and includes three sections, a tail section 202 that includes one or more recesses, a middle section 204 that includes a handle 218, and a head section 206 that includes one or more recesses. For example, the tail section 202 as shown includes the recesses 214a-214b while the head section 206 includes the recesses 212 and 216.

In some implementations, the length 208 of the body 200 is larger than the width 210 of the body 200. For example, the length 208 can be three (3) to five (5) times the width 210.

Figure 2B:
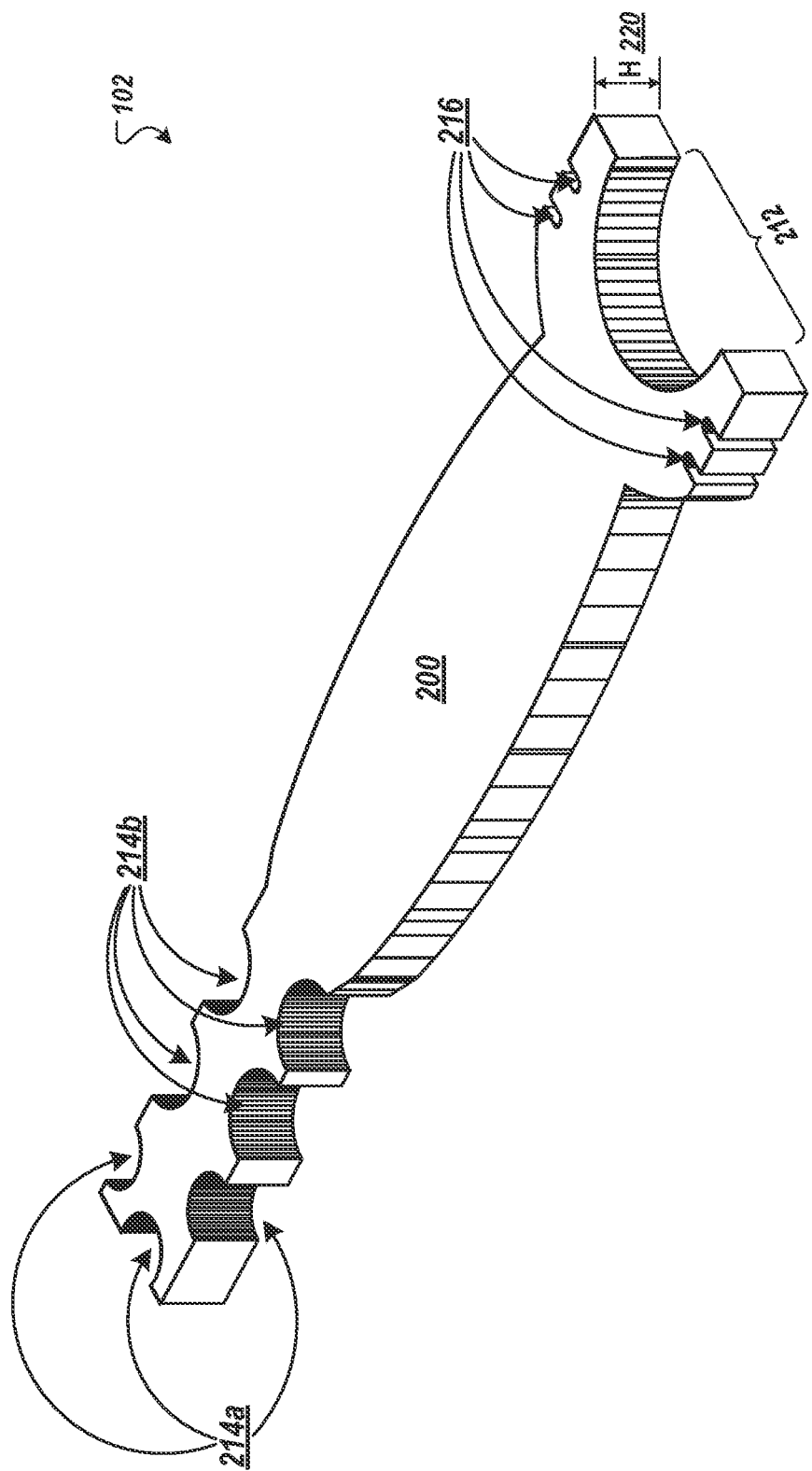
FIG. 2B is a perspective view of the example tool for removing biofouling.

As shown in FIG. 2A and FIG. 2B described in more detail below, recesses 212, 214a-214b, and 216 span the height of the body 200 and have different sizes in order to accept cylindrical objects of various sizes. "Cylindrical objects" as used herein may also include roughly cylindrical objects.

For example, semicircular recess 112 is sized to accept larger cylindrical objects such as the trunk 112 of the coral tree 110 shown in FIG. 1, whereas semicircular recesses 214a-214b are sized to accept smaller cylindrical objects such the branches 114 of the coral tree 110. As shown, the semicircular recesses 214a-214b include a first set of semicircular recesses 214a having a radius of a first size and configured to accept smaller-sized branches, and a second set of semicircular recesses 214b having a radius of a second size that is larger than the first size and configured to accept larger-sized branches. Alternatively, the tool 102 can instead include one set of recesses configured for branches that are all the same size and shape. Finally, slots 216 are sized to accept even smaller cylindrical objects such as the lines 116 of the coral tree 110, e.g., monofilament lines, multifilament lines, or strings.

Recesses 212, 214a-214b, and 216 may be positioned at any point along a length or width of the body 200. Recesses 212, 214a-214b, and 216 further comprise edges on either side of the recess that may be used as a point of contact to scrape along the outside of cylindrical objects. These edges may be smooth, or uniform. However, it is appreciated that coarse, or serrated, edges may be useful in breaking apart firmer biofouling. In certain embodiments, the biofouling removal tool 102 may contain recesses with a plurality of edge textures including smooth and coarse edges. These edges may be formed during the initial manufacturing process (e.g., naturally as a result of sufficiently tight tolerances from CNC, laser cutting, plasma cutting, waterjet, or other process; purposefully added to the design and achieved during manufacturing process such as through the use of a 3-axis, 4-axis, or 5-axis CNC, etc.) or during one or more later processes (e.g., sanding, filing, abrasive blasting, etc.).

In some implementations, an abrasive coating is applied to all or part of the body 200 of the tool 102. This coating may include, for example, sand, industrial diamonds, or other abrasive material. The abrasive coating may provide the diver 104 more grip to better operate the tool 102 while also improving the tool 102's performance in removing biofouling.

In some implementations, the body 200 is a made from a single material. The material can be, for example, a metal, a metal alloy, a polycarbonate, or polymer.

In some implementations, the tool 102 and the body 200 is one solid piece of material having a uniform or substantially uniform density. For example, the tool 102 can be manufactured by laser cutting a 10 mm sheet of aluminum or stainless steel.

In some implementations, the body is constructed from a resilient material. Resilient material may include, but is not limited to, stainless steel, aluminum, carbon fiber, or polycarbonate.

In some implementations, the body 200 is constructed from a water-resistant material. "Water-resistant," as used herein, is defined as a substance that is not easily damaged or affected by water and does not allow water to pass through it easily. As used herein, water-resistant may also include waterproof substances. Water-resistant material may include, but is not limited to, stainless steel, aluminum, or carbon fiber.

In some implementations, the outer surface of the body 200 is treated with a water-resistant coating. Such a coating may include, but is not limited to, polyamide epoxy coatings and fluoropolymer coatings. Treating the body with a water-resistant coating may be particularly useful when the material used to construct the body is not water-resistant (e.g., high carbon steel), but water-resistant material may also be treated with the water-resistant coating.

The handle 218 of the biofouling removal tool 218 permits the diver 104 to grab the tool 102 and use the tool 102. The handle 218 can be formed from the middle section 204 of the body 200. That is, the body 200 and the handle 218 are one integrated piece. Alternatively, the handle 218 can be a separate piece that is connected to the body 200.

In some implementations, the handle 218 is not positioned in the middle section 204 of the body 200. For example, the handle 218 may be positioned in the tail section 202 and the recesses 214a-214b may be positioned in the middle section 204 of the body 200.

As shown, the handle 218 has a curved shape that provides ergonomic comfort to the diver 104 and accommodates most hand shapes and sizes. However, other shapes for the handle 218 are possible. For example, the handle 218 may alternatively include one or more recesses (e.g., less pronounced than the recesses 214a-214b) to accommodate diver 104's fingers and/or to provide the diver 104 additional grip when using the tool 102 to remove biofouling.

As shown in FIG. 2A, the recesses 212, 214a-214b, and 216 are positioned along both sides of the length and width of the body and on either side of the handle 218. In more detail, the recesses 214a-214b are positioned in the tail section 202 behind the handle 218, and the recesses 216 and 212 are positioned in front of the handle 218. In other embodiments, the recesses 212, 214a-214b, and 216 may be positioned only on one side of the handle 218. In some embodiments, at least one of the recesses 212 or 214a-214b may be positioned along the length of the handle 218.

As shown in FIG. 2A, the middle section 204 can have an elliptical or an elliptical-type shape such that the width of the middle section 204 is greater at a location between where the middle section 204 meets the tail section 202 and meets the head section 206 than (i) a width of the middle section 204 where it meets the tail section 202 and (ii) a width of the middle section 204 where it meets the head section 206. For example, the middle section 204 can have or be defined by (i) a major axis that runs the length of the middle section 204 and that is parallel to the length 208, and (ii) a minor axis that is smaller than and perpendicular to the major axis, that runs the width of the middle section 204 where the width of the middle section 204 is greatest, and is parallel to the width 210. The shape of the middle section 204 may be such that the minor axis is never located where the middle section 204 meets the tail section 202 and never located where the middle section 204 meets the tail section 202. Additionally or alternatively, the shape of the middle section 204 may be such that the minor axis crosses the major axis at a location half-way or substantially half-way between where the major axis meets the tail section 202 and the where the major axis meets the head section 206.

As shown in FIG. 2A, the handle 218 can have an elliptical or an elliptical-type shape such that the width of the handle 218 is greater at a location between where the handle 218 contacts the tail section 202 and contacts the head section 206 than (i) a width of the handle 218 where it contacts the tail section 202 and (ii) a width of handle 218 where it contacts the head section 206. For example, the handle 218 can have or be defined by (i) a major axis that runs the length of the handle 218 and that is parallel to the length 208, and (ii) a minor axis that is smaller than and perpendicular to the major axis, that runs the width of the handle 218 where the width of the handle 218 is greatest, and is parallel to the width 210. The shape of the handle 218 may be such that the minor axis is never located where the handle 218 contacts the tail section 202 and never located where the handle 218 contacts the tail section 202. Additionally or alternatively, the shape of the handle 218 may be such that the minor axis crosses the major axis at a location half-way or substantially half-way between where the major axis meets the tail section 202 and the where the major axis meets the head section 206.

FIG. 2B shows a perspective view of the example biofouling removal tool 102. As shown in FIG. 2B, the recesses 212, 214a-214b, and 216 span a height 220 of the body 200. The recesses 212, 214a-214b, and 216 are all oriented perpendicular with respect the top surface of the body 200 such that they are substantially vertical. In other implementations, one or more of the recesses 212, 214a-214b, and 216 may have a non-vertical orientation to, for example, provide a sharper edge on one side of the body 200 and a duller but longer-lasting edge on an opposite side of the body 200.

As shown in FIGS. 2A-2B, the recesses 212 and 214a-214b can be semicircular shaped to accept outer surfaces of cylindrical objects such as pipes or rods. To clean pipes, a user (e.g., the diver 104 shown in FIG. 1) first selects a semicircular recess that is sized to accept the pipe in question. In the example shown, the semicircular recesses 212 and 214a-214b have a plurality of diameters, such that the semicircular recess 212 accept a pipe up to a first size (e.g., up to the size of the trunk 112 shown in FIG. 1) or with a first level of biofouling buildup, the semicircular recesses 214b accept a pipe or rod up to a second size that is smaller than the first size (e.g., up to the size of one of the branches 114 shown in FIG. 1) and/or pipes or rods with a second level of biofouling buildup that is less than a first level of biofouling buildup, and the semicircular recesses 214a accept a pipe or rod up to a third size that is smaller than the first size and the second size (e.g., up to the size of one of the branches 114 shown in FIG. 1 or of a branch of a different coral tree made from a pipe or rod having a radius smaller than the branches 114 of the coral tree 110 shown in FIG. 1) and/or pipes or rods with a third level of biofouling buildup that is less than a second level of biofouling buildup.

As an example, when the semicircular recesses 212 or 214a-214b are sized appropriately to accept the trunk 112 and the branch 114a, substantially all of the edge on either side of the semicircular recess 112 or 214a-214b can make contact with an arc on the outer surface of the trunk 112 or branch 114a. The semicircular recesses 212 or 214a-214b may be sized appropriately when they have radii that are equal to or larger than the radii of corresponding cylindrical objects that they are sized to accept.

In some implementations, the semicircular recesses 212 or 214a-214b have radii that are larger than the radii of the cylindrical structures that they are sized to accept. This sizing may help to account for biofouling buildup on the cylindrical structures that effectively increase the size of those structures. For example, one or more of the semicircular recesses 212 and 214a-214b can have radii that are 3%, 5%, 10%, 15%, 20%, 25%, 3-5%, 3-10%, 3-15%, 3-20%, 3-25%, 5-10%, 5-15%, 5-15%, 5-20%, 5-25%, 10-15%, 10-20%, 10-25%, 15-20%, 15-25%, or 20-25% larger than the radii of the corresponding pipes or rods that they are sized to accept. In more detail, the recess 212 can have a radius that is 10% larger than the radius of the trunk 112 shown in FIG. 1, the recesses 214a can have a radius that is 5% larger than the radius of the branches 114 shown in FIG. 1 to account for a first level of biofouling buildup, and the recesses 214b can have a radius that is 15% larger than the radius of the branches 114 shown in FIG. 1 to account for a second level of biofouling buildup that is larger than the first level of biofouling buildup.

In some implementations, the body 200 has a uniform height or a substantially uniform height. Having a uniform or substantially uniform height can reduce manufacturing complexity and improve manufacturing consistency.

In some implementations, the width 210 shown in FIG. 2A of the body 200 is larger than the height 220 of the body. For example, the width 210 can be four (4) to seven (7) times the height 220 of the body 200.

In some implementations, the recesses 214a-214b are all the same size and/or shape. For example, the recesses 214a-214b may each have the same or substantially the same radius.

In some implementations, each of the recesses 212, 214a-214b, and 216 have a uniform size and shape that spans the height of the tool 102, such as shown in FIGS. 2A-2B. For example, the radius of the semicircular recess 212 can be maintained through the height of the tool 102 such that the recess 212 has a radius where the recess 212 meets a top surface of the tool 102 that is equal to a radius where the recesses 212 meets a bottom surface of the tool 102. Maintaining a uniform shape that spans the height of the tool 102 can reduce manufacturing complexity, and, therefore, reduce manufacturing time and improve tool consistency.

In some implementations, one or more of the recesses 212, 214a-214b, and 216 have a non-uniform size or shape that changes through the height of the tool 102. For example, the recess 212 can have a radius with a first size where the recess 212 meets a top surface of the tool 102 and a radius with a second size, different from the first size such as a larger size, where the recess 212 meets a bottom surface of the tool 102. This could allow the recess 212 to be used for different levels of biofouling buildup. Continuing the earlier example, a first edge of the recess 212—where the recess meets the top surface of the tool 102—could be configured to scrape off biofouling buildup of a first level, and a second edge of the recess 212—where the recess 212 meets the bottom surface of the tool 102—could be configured to scrape off biofouling buildup of a second level that is greater than the first level.

Figure 3:
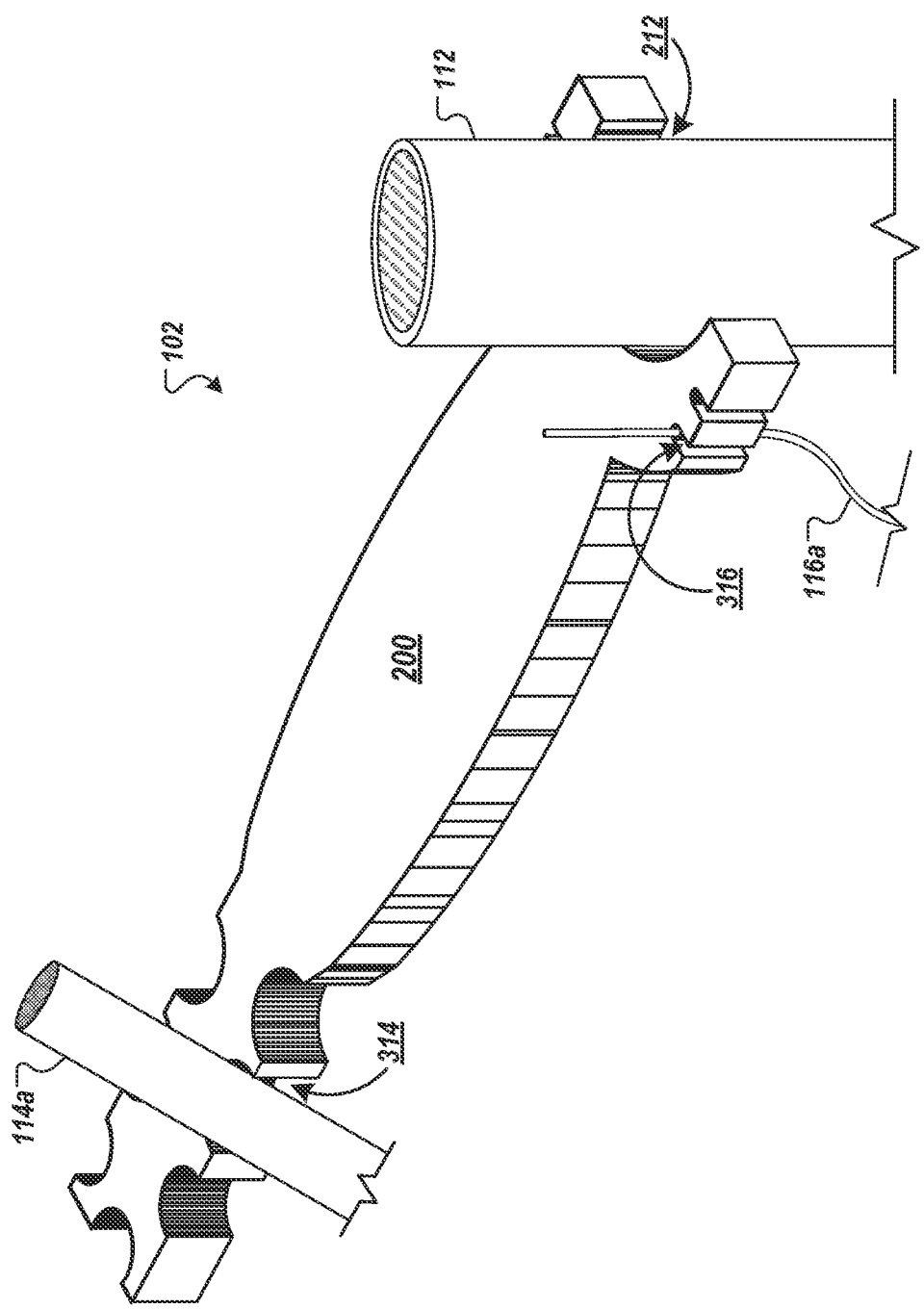
FIG. 3 is a perspective view of the example tool for removing biofouling accepting cylindrical objects of various sizes to clean.

FIG. 3 is a perspective view of the example biofouling removal tool 102 accepting cylindrical objects of various sizes to clean. As shown, the trunk 112 (e.g., PVC pipe) of the coral tree 110 shown in FIG. 1 is being cleaned using the semicircular recess 212 of the tool 102 located in the head section 206 of the body 200. Also shown is a branch 114a (e.g., fiberglass rod or PVC pipe) of the branches 114 shown in FIG. 1 being cleaned using a recess 314 of the recesses 214b shown in FIGS. 2A-2B. Finally, a line 116a of the lines 116 shown in FIG. 1 is being cleaned using a slot 316 of the recesses 216 shown in FIGS. 2A-2B.

The semicircular recesses 212 and 314 are shaped to accept outer surfaces of larger cylindrical objects such as pipes or rods. To clean pipes, the diver 104 first selects a semicircular recess that is sized to accept the pipe in question. In the example shown, the semicircular recesses 212 and 314 have a plurality of diameters, so that semicircular recess 112 may accept a pipe the size of the trunk 112, whereas one of semicircular recess 214a-214b may not accept a pipe of the size of the trunk 112 and only accept a pipe of the size of the branch 114a or smaller. When the semicircular recesses 212 or 214a-214b are sized appropriately to accept the trunk 112 and the branch 114a, substantially all of the edge on either side of the semicircular recess 112 or 214a-214b can make contact with an arc on the outer surface of the trunk 112 or branch 114a.

To clean the trunk 112 or the branch 114a, the diver next applies pressure with the semicircular recess 212 to the trunk 110 or the semicircular recess 314 to the branch 114a and scrapes the edge of the recess 212 along the outer surface of the trunk 112 or the branch 114a. This scraping removes an amount of an accumulated biofouling from the outside of the trunk 112 or the branch 114a. This method can be used to clean a trunk or a branch of a coral tree made from a PVC pipe. However, other pipes and other cylindrical objects of similar sizes such as rods also may be cleaned in this way. This biofouling removal tool 102 allows such cylindrical objects to be cleaned more efficiently than with other tools such as a chisel or a brush.

In some implementations, the tool 102 includes recesses with both smooth edges and course edges. The diver may select a recess with smooth edges to remove more delicate biofouling and a recess with coarse edges to remove firmer biofouling. The diver next applies pressure with the semicircular recesses 212 and 214a-214b to pipes 201 and 202 and scrapes along the outside of pipes 201 and 202. This scraping removes an amount of an accumulated biofouling from the outside of cylinders 201 and 202. Although this exemplary method describes cleaning pipes, other pipes and other cylindrical objects of similar sizes such as rods also may be cleaned in this way. This biofouling removal tool 102 allows such cylindrical objects to be cleaned more efficiently than with other tools such as a chisel or a brush.

Referring still to FIG. 3, the biofouling removal tool 102 may also be used to clean smaller cylindrical objects such as monofilament lines and string. To clean the line 116a, the diver 104 first selects a slot 316 that is sized to accept it. The slot recesses 216 shown in FIGS. 2A-2B may all have the same size, or they may have a plurality of different sizes. When the slot 316 is sized appropriately to accept a line 116a, the line 116a fits within the slot 316 and an outer surface of the line 116a reaches or comes close to reaching the base of the slot 316. In this exemplary embodiment, the diver 104 places the line 116a within the slot 316 until it reaches the base. The diver then applies pressure to the line 116a and scrapes along the outside of line 116a with an edge of the slot 316. This scraping removes an amount of accumulated biofouling from the outside of the line 116a. Although this exemplary embodiment describes cleaning lines such as monofilament lines, other small cylindrical objects such as strings or multifilament lines may be cleaned in this way. This biofouling removal tool 102 allows such cylindrical objects to be cleaned more efficiently than with other tools such as a chisel and brush.

In some implementations, the recesses 216 of the tool 102 include one or more recesses with smooth edges and one or more recesses with rough edges. As an example, the diver 104 may select a slot of the recesses 216 with smooth edges to remove more delicate biofouling and a slot of the recesses 216 with coarse edges to remove firmer biofouling.

In some implementations, one or more recesses 216 of the tool 102 are V-slot shaped such that the recess gets progressively narrower while traveling deeper into the recess. The V-slot recess provides a number of benefits. For example, it permits cleaning a variety of different sized lines. In addition, the V shape helps a diver guide a line into the slot. For example, as biofouling accumulates on the line, the line's radius expands by a significant amount. Therefore, having a V-shaped slot with a wider opening allows the line with the biofouling to fit into the V-shaped slot and permits the user to clean the line with the V-shaped slot of the tool. However, a V-shaped slot may introduce additional wear on a line than, for example, other slot shapes.

In some implementations, one or more recesses 216 of the tool 102 are U shaped or rectangular shaped such that the recess has a uniform width for most of its depth. U shaped or rectangular shaped slots provides a number of benefits. For example, although slots shaped in this way are more limited in in the number of different sized lines they can clean, they introduce less wear on the lines that they are fitted to. As an example, the tool 102 can include two or more different sized U-shaped slots to accommodate two different line thicknesses.

Figure 4A:
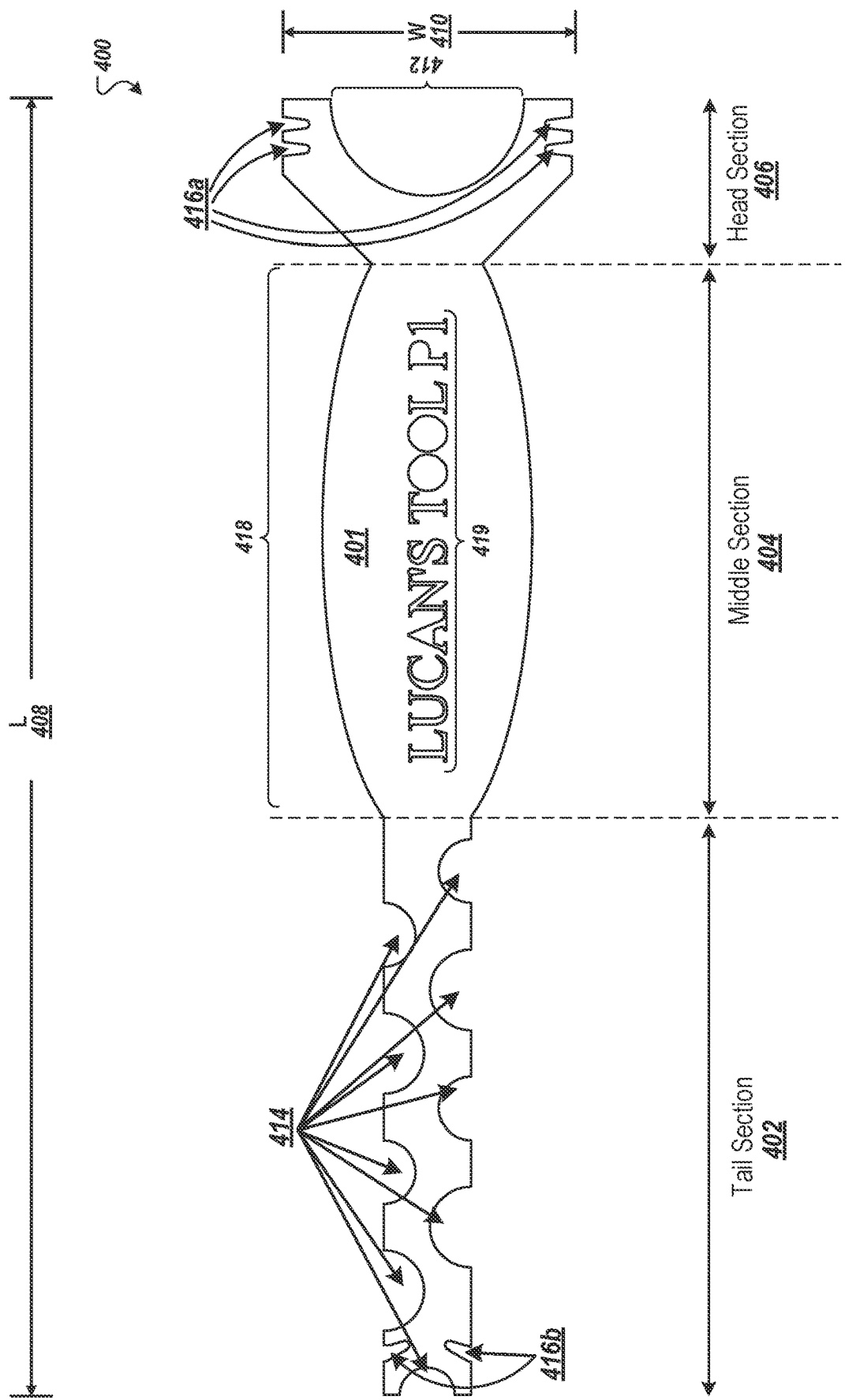
FIG. 4A is a top view of another example tool for removing biofouling.

FIG. 4A is a top view of another example tool 400 for removing biofouling. The biofouling removal tool 400 includes a body 401 and a plurality of recesses 412, 414, and 416a-416b formed in the body 401. These recesses can include semicircular or semicylindrical shaped recesses ("semicircular recesses"), such as recesses 412 and 414, or slots, as in recesses 416a-416b. The body 401 has a length (L) 408 and a width (W) 410 and includes three sections, a tail section 402 that includes one or more recesses, a middle section 404 that includes a handle 418, and a head section 406 that includes one or more recesses. For example, the tail section 402 as shown includes the recesses 214 and 416b while the head section 406 includes the recesses 412 and 416a. The body 401 further includes one or more cavities 419 formed in the middle section 404 of the body 401. As shown, these cavities 419 span the height of the body 401. Although shown in the form of text, the cavities may come in the form of various other designs or structures such as skeletonized structures. The cavities 419 can, for example, help to reduce the weight of the tool 400. In addition, one or more of the cavities 419 can serve other functions such as providing a spot to tie a cord that can then be secured to a diver's wrist. For example, the "O" cavity of the cavities 419 is configured to permit tying of parachute cord that can then be tied to a diver's wrist to secure the tool 400 to the diver.

In some implementations, the cavities 419 do not span the full height of the body 401. For example, the cavities 419 may instead span ¼ of the height and be placed on both the top and bottom surface of the body 401.

Figure 4B:
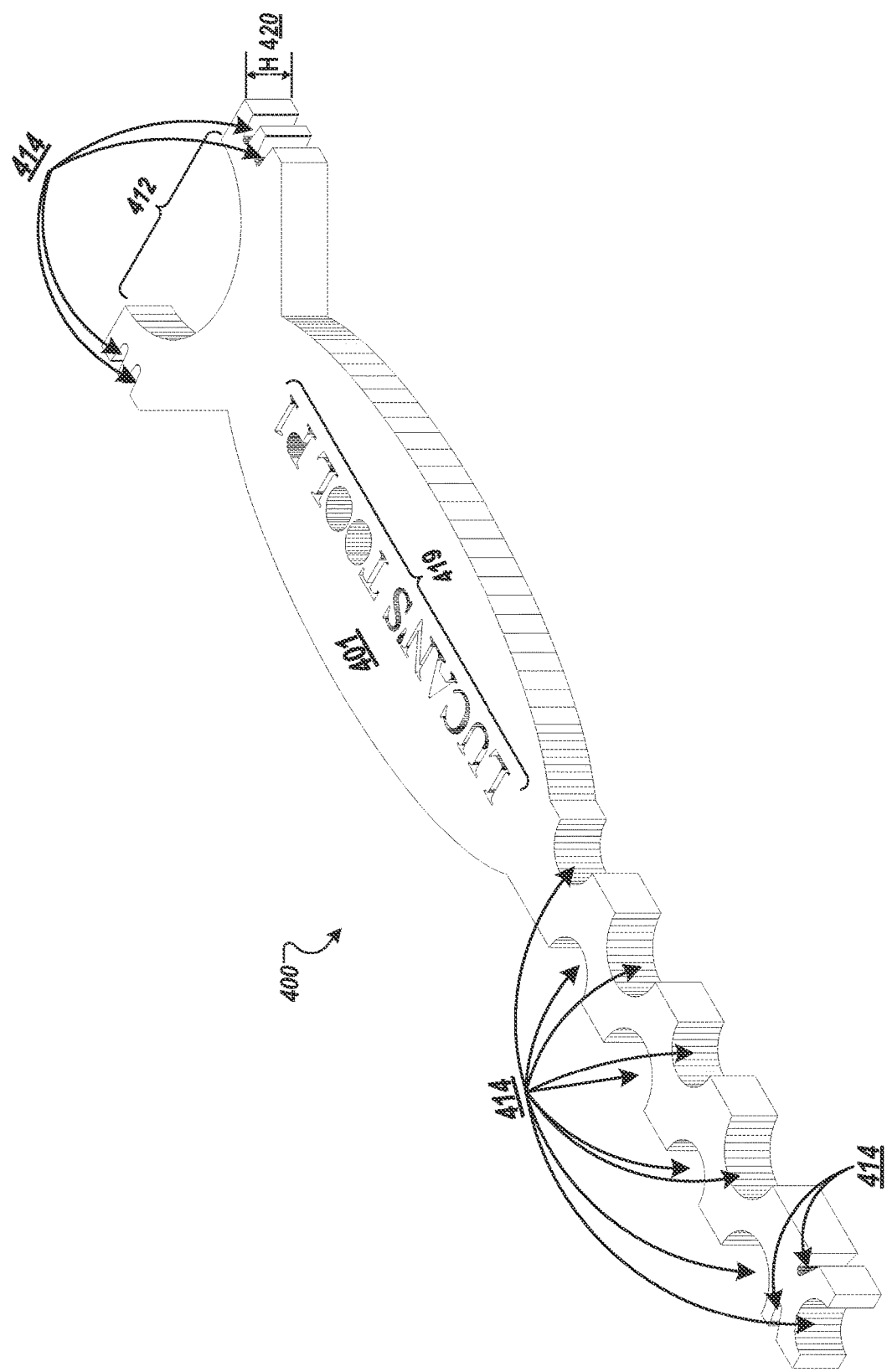
FIG. 4B is a perspective view of another example tool for removing biofouling.

As shown in FIG. 4A and FIG. 4B described in more detail below, recesses 412, 414, and 416a-416b span the height of the body 401 and have different sizes in order to accept cylindrical objects of various sizes. "Cylindrical objects" as used herein may also include roughly cylindrical objects.

For example, semicircular recess 412 is sized to accept larger cylindrical objects such as the trunk 112 of the coral tree 110 shown in FIG. 1, whereas semicircular recesses 414a are sized to accept smaller cylindrical objects such the branches 114 of the coral tree 110. As shown, the semicircular recesses 414 include semicircular recesses of different sizes configured to accept different sized branches or pipes. Alternatively, the tool 400 can instead include one set of recesses configured for branches or small pipes that are all the same size and shape. Finally, slots 416a-416b are sized to accept even smaller cylindrical objects such as the lines 116 of the coral tree 110, e.g., monofilament lines, multifilament lines, or strings. As shown, a first set of slots 416a is V-shaped and located in the head section 406 of the body 401, and a second set of slots 416b is V-shaped at an angle and is located in the tail section 402 of the body 401.

As shown in FIG. 4A, recesses 412, 414, and 416a-416b may be positioned at any point along a length or width of the body 401. Recesses 412, 414, and 416a-416b further comprise edges on either side of the recess that may be used as a point of contact to scrape along the outside of cylindrical objects. These edges may be smooth, or uniform. However, it is appreciated that coarse, or serrated, edges may be useful in breaking apart firmer biofouling. In certain embodiments, the biofouling removal tool 400 may contain recesses with a plurality of edge textures including smooth and coarse edges. These edges may be formed during the initial manufacturing process (e.g., naturally as a result of sufficiently tight tolerances from CNC, laser cutting, plasma cutting, waterjet, or other process; purposefully added to the design and achieved during manufacturing process such as through the use of a 3-axis, 4-axis, or 5-axis CNC, etc.) or during one or more later processes (e.g., sanding, filing, abrasive blasting, etc.).

As shown in FIG. 4A, the middle section 404 can have an elliptical or an elliptical-type shape such that the width of the middle section 404 is greater at a location between where the middle section 404 meets the tail section 402 and meets the head section 406 than (i) a width of the middle section 404 where it meets the tail section 402 and (ii) a width of the middle section 404 where it meets the head section 406. For example, the middle section 404 can have or be defined by (i) a major axis that runs the length of the middle section 404 and that is parallel to the length 408, and (ii) a minor axis that is smaller than and perpendicular to the major axis, that runs the width of the middle section 404 where the width of the middle section 404 is greatest, and is parallel to the width 410. The shape of the middle section 404 may be such that the minor axis is never located where the middle section 204 meets the tail section 202 and never located where the middle section 404 meets the tail section 202. Additionally or alternatively, the shape of the middle section 404 may be such that the minor axis crosses the major axis at a location half-way or substantially half-way between where the major axis meets the tail section 402 and the where the major axis meets the head section 406.

As shown in FIG. 4A, the handle 418 can have an elliptical or an elliptical-type shape such that the width of the handle 418 is greater at a location between where the handle 418 contacts the tail section 402 and contacts the head section 406 than (i) a width of the handle 418 where it contacts the tail section 402 and (ii) a width of handle 218 where it contacts the head section 406. For example, the handle 418 can have or be defined by (i) a major axis that runs the length of the handle 218 and that is parallel to the length 408, and (ii) a minor axis that is smaller than and perpendicular to the major axis, that runs the width of the handle 218 where the width of the handle 418 is greatest, and is parallel to the width 410. The shape of the handle 418 may be such that the minor axis is never located where the handle 418 contacts the tail section 402 and never located where the handle 418 contacts the tail section 402. Additionally or alternatively, the shape of the handle 418 may be such that the minor axis crosses the major axis at a location half-way or substantially half-way between where the major axis meets the tail section 402 and the where the major axis meets the head section 406.

FIG. 4B is a perspective view of another example tool 400 for removing biofouling. As shown in FIG. 24B, the recesses 412, 414, and 416a-416b span a height 420 of the body 401. The recesses 412, 414, and 416a-416b are all oriented perpendicular with respect the top surface of the body 401 such that they are substantially vertical. In other implementations, one or more of the recesses 412, 414, and 416a-416b may have a non-vertical orientation so as to, for example, provide a sharper edge on one side of the body 200 and a duller but longer-lasting edge on an opposite side of the body 200.

As shown in FIGS. 4A-4B, the recesses 412 and 414 can be semicircular shaped to accept outer surfaces of cylindrical objects such as pipes or rods. To clean pipes, a user (e.g., the diver 104 shown in FIG. 1) first selects a semicircular recess that is sized to accept the pipe in question. In the example shown, the semicircular recesses 412 and 414 have a plurality of diameters, such that the semicircular recess 412 accept a pipe up to a first size (e.g., up to the size of the trunk 112 shown in FIG. 1) or with a first level of biofouling buildup, and the semicircular recesses 414 accept pipes or rods of various sizes smaller than the first size (e.g., sizes of different coral tree branches or branches with different levels of biofouling buildup) and/or pipes or rods with less than a first level of biofouling buildup.

As an example, when the semicircular recesses 212 or 214a-214b are sized appropriately to accept the trunk 112 and the branch 114a, substantially all of the edge on either side of the semicircular recess 112 or 214a-214b can make contact with an arc on the outer surface of the trunk 112 or branch 114a. The semicircular recesses 212 or 214a-214b may be sized appropriately when they have radii that are equal to or larger than the radii of corresponding cylindrical objects that they are sized to accept. It may be preferable that the semicircular recesses 212 or 214a-214b have radii that is slightly larger (e.g., 3%, 5%, 10%, 15%, 20%, 25%, 3-5%, 3-10%, 3-15%, 3-20%, 3-25%, 5-10%, 5-15%, 5-15%, 5-20%, 5-25%, 10-15%, 10-20%, 10-25%, 15-20%, 15-25%, or 20-25% larger) than the radii of the pipes or rods that they are sized to accept.

In some implementations, the recesses 414 include recesses of different sizes. For example, the recesses 414 can include a first set of recesses having a first radius and a second set of recesses having a second radius larger than the first radius. The first set of recesses can be sized, for example, to accept coral tree branches with a first level of biofouling buildup on the branches, and the second set of recesses can be sized to accept the same coral tree branches but with a second level of biofouling buildup that is greater than the first level of biofouling buildup. Generally, the greater the level of biofouling buildup on a structure (e.g., pipe, rod, or line) the larger a recess needs to be to accept the structure and effectively clean the structure.

In some implementations, the recesses 414 are all the same size and/or shape. For example, the recesses 414 may each have the same or substantially the same radius.

In some implementations, each of the recesses 412, 414, and 416a-416b have a uniform size and shape that spans the height of the tool 400, such as shown in FIGS. 4A-4B. For example, the radii of the semicircular recesses 414 can be maintained through the height of the tool 400 such that each of the recesses 414 has a radius where the corresponding recess meets a top surface of the tool 400 that is equal to a radius where the corresponding recesses meets a bottom surface of the tool 400. Maintaining a uniform shape that spans the height of the tool 400 can reduce manufacturing complexity, and, therefore, reduce manufacturing time and improve tool consistency.

In some implementations, one or more of the recesses 412, 414, and 416a-416b have a non-uniform size or shape that changes through the height of the tool 400. For example, one of the recesses 414 can have a radius with a first size where the recess meets a top surface of the tool 400 and a radius with a second size, different from the first size such as a larger size, where the recess meets a bottom surface of the tool 400. This could allow the same recess to be used for different levels of biofouling buildup. Continuing the earlier example, a first edge of the recess—where the recess meets the top surface of the tool 400—could be configured to scrape off biofouling buildup of a first level, and a second edge of the recess—where the recess meets the bottom surface of the tool 400—could be configured to scrape off biofouling buildup of a second level that is greater than the first level.

In some implementations, the body 401 has a uniform height or a substantially uniform height. Having a uniform or substantially uniform height can reduce manufacturing complexity and improve manufacturing consistency.

It is recognized that, in certain embodiments, the biofouling removal tool 400 may be susceptible to breaking at or around where the tail section 402 of the tool 400 meets the middle section 404 and/or the handle 418 of the body during cleaning. This risk may increase with an increasing number of recesses 412 or 414a-414b formed from the body or an increased length of the body. In certain embodiments, recesses 412, 414a-414b, and 416 may also be at risk of wearing down through repeated use. These risks of breaking at or around where the tail section 402 and the middle section 404 or wearing down may be mitigated by constructing the body of the tool 400 from resilient, durable materials such as, but not limited to, stainless steel, aluminum, or carbon fiber. In other embodiments, the risk of breakage at or around where the tail section 402 and the middle section 404 meet may be mitigated by increasing the width or height of the body of tool 400 to reinforce the tool 400, or decreasing the length of the body to reduce torque placed on the biofouling removal tool 400 during cleaning to achieve a design such as that of the tool 102 shown in FIG. 1, FIGS. 2A-2B, and FIG. 3.

In some implementations, the biofouling removal tool 102 or the biofouling removal tool 400 includes a cavity formed in the body of the tool. This cavity can be sized and shaped to allow a loop to be threaded through it, such as circular hole or the "O" cavity of the cavities 419 of the tool 400 shown in FIGS. 4A-4B. The loop may be secured to, for example, a diver's wrist to ensure that the biofouling removal tool is not lost while underwater. This cavity may be circular, or it may be, for example, elliptical or rectangular. The cavity can be positioned within the handle 216 of the tool 102 or the handle 416 of the tool 400. However, the cavity may be positioned elsewhere within the biofouling removal tool 102.

In some implementations, the biofouling removal tool 102 or the biofouling removal tool 400 is made from a ferrous metal and a diver uses a magnet to secure the tool during diving. For example, the tool 102 may be made from ferritic stainless steel (e.g., 430 stainless steel) and the diver can wear a belt with a magnet to secure the tool 102. In more detail, the diver can place the biofouling removal tool 102 on or near the magnet to secure it while the tool 102 is not in use, for example, while diving down to a coral tree or swimming up to the surface after cleaning the coral tree. As another example, the tool 102 may be made from another type of magnetic stainless steel, such as a martensitic stainless steel, a precipitation hardened stainless steel, or a duplex stainless steel.

In some implementations, the tool 102 shown in FIG. 1, FIGS. 2A-2B, and FIG. 3 and/or the tool 400 shown in FIGS. 4A-4B is formed from a single material such that the tool has a uniform or substantially uniform density. For example, the entire tool 102 and/or the tool 400 can be made from a metal such as aluminum or a metal alloy such as steel. As another example, the entire tool 102 and/or the tool 400 can be made from carbon fiber, a polycarbonate, or a high-strength polymer such as polyamideimide or polyetherimide.

In some implementations, the tool 102 shown in FIG. 1, FIGS. 2A-2B, and FIG. 3 and/or the tool 400 shown in FIGS. 4A-4B is manufactured using subtractive manufacturing techniques. For example, the tool 102 and/or the tool 400 can be manufactured by laser cutting, plasma cutting, or water jet cutting the shape of the tool from sheets of material. As another example, the tool 102 and/or the tool 400 can be manufactured using a multi-axis CNC machine.

In some implementations, the tool 102 shown in FIG. 1, FIGS. 2A-2B, and FIG. 3 and/or the tool 400 shown in FIGS. 4A-4B is manufactured using additive manufacturing. For example, the tool 102 and/or the tool 400 can be made from a thermoplastic using a 3D printer.

In some implementations, all recesses of the tool 102 shown in FIG. 1, FIGS. 2A-2B, and FIG. 3 and/or the tool 400 shown in FIGS. 4A-4B span a height of the respective tool. For example, the recesses 212, 214a-214b, and 216 may all span the full height 220 of the tool 102.

Figure 5:
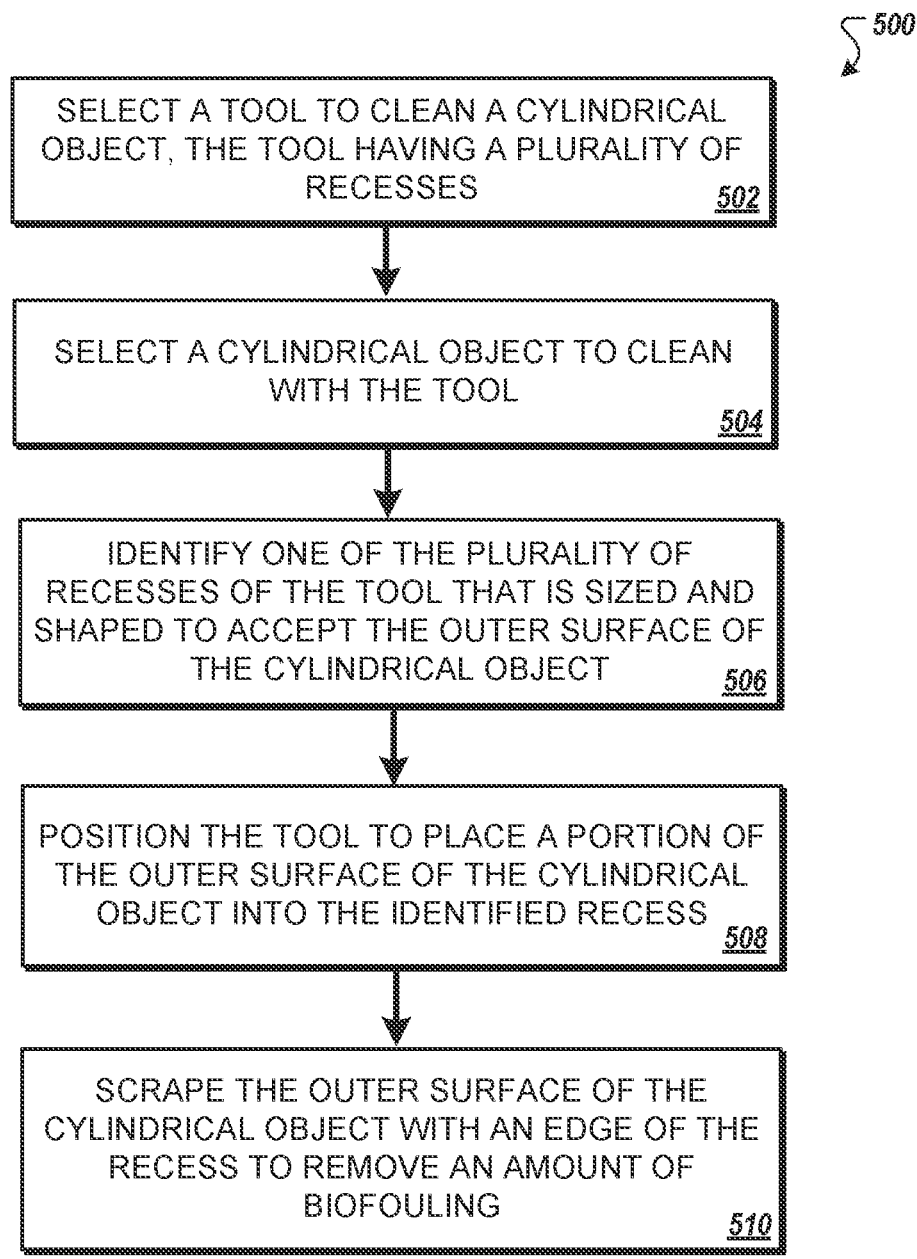
FIG. 5 is a flow chart depicting an example process for using a tool to remove biofouling.

FIG. 5 is a flow chart depicting an example process 500 for using a tool to remove biofouling. The process can be performed by a user of the tool 102 shown in FIG. 1, FIGS. 2A-2B, and FIG. 3 or of the tool 400 shown in FIGS. 4A-4B, such as the diver 104 shown in FIG. 1. The process 500 can be performed by the user while the user is underwater. For example, the process 500 can be performed by a diver wearing scuba gear.

The process 500 includes selecting a tool to clean a cylindrical object, the tool having a plurality of recesses (502). For example, with respect to FIG. 1 and FIGS. 2A-2B, the diver 104 can select the tool 102 that includes recesses 212, 214a-214b, and 216 that are sized and shaped to clean different cylindrical objects, such as pipes (e.g., trunk 112 of the coral tree 110 and/or branches 114 of the coral tree 110), rods (e.g., branches 114 of the coral tree 110), or lines (e.g., lines 116 of the coral tree 110 that can be monofilament lines). The recesses 212, 214a-214b, and 216 can have edges configured to scrape the outer surfaces of the cylindrical objects to remove biofouling.

The process 500 includes selecting a cylindrical object to clean with the tool (504). For example, with respect to FIG. 1, the diver 104 can select the trunk 112 of the coral tree 110 to clean with the tool 102 after observing biofouling accumulation on the trunk 112.

The process 500 includes identifying one of the plurality of recesses of the tool that is sized and shaped to accept the outer surface of the cylindrical object (506). For example, with respect to FIG. 1, FIGS. 2A-2B, and FIG. 3, the diver 104 can select the recess 212 to clean the trunk 112 of the coral tree 110 because the recess 212 is sized and shaped to clean pipes of the size of the trunk 112.

The process 500 includes positioning the tool to place a portion of the outer surface of the cylindrical object into the identified recess (508). For example, with respect to FIG. 1 and FIG. 3, the diver 104 can position the tool 102 such that part of the trunk 112 is placed into the recess 212 as shown in FIG. 3 so that the at least part of the recess 212 (e.g., all or part of an edge of the recess 212) comes into contact with part of the outer surface of the trunk 112.

The process 500 includes scraping the outer surface of the cylindrical object with an edge of the recess to remove an amount of biofouling (510). For example, with respect to FIG. 1 and FIG. 3, after positioning the tool 102 such that the trunk 112 is placed partially into the recess 212, the diver 104 can drag an edge of the recess 212 against the outer surface of the trunk 112 to remove an amount of biofouling that accumulated on the outer surface of the trunk 112.

A number of implementations have been described. Nevertheless, it will be understood that various modifications may be made without departing from the spirit and scope of the disclosure. For example, various forms of the flows shown above may be used, with steps re-ordered, added, or removed.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In addition to the implementations and/or embodiments described above, the following embodiments are also innovative:

Embodiment 1 is a tool for cleaning underwater structures, comprising:
 a body; and
 a plurality of recesses formed in the body and positioned along at least one of a length and a width of the body, wherein at least one of the plurality of recesses spans a height of the body.

Embodiment 2 is the tool of embodiment 1, wherein the height of the body is substantially uniform throughout the body.

Embodiment 3 is the tool of any one of embodiments 1-2, wherein:
 a maximum width dimension of the body is greater than the height of the body; and
 a maximum length dimension of the body is greater than the width and height of the body.

Embodiment 4 is the tool of embodiment 3, wherein the maximum width dimension of the body is 4 to 7 times the height of the body.

Embodiment 5 is the tool of any one of embodiments 3-4, wherein the maximum length dimension of the body is 3 to 5 times the maximum width dimension of the body.

Embodiment 6 is the tool of any one of embodiments 1-5, wherein the plurality of recesses are sized and shaped to accept an outer surface of a cylindrical object.

Embodiment 7 is the tool of any one of embodiments 1-6, wherein at least one of the plurality of recesses is (i) semicircular or semicylindrical shaped and (ii) sized to accept an outer surface of a pipe or a rod.

Embodiment 8 is the tool of any one of embodiments 1-7, wherein at least one of the plurality of recesses is a slot that is sized and shaped to accept an outer surface of a monofilament line, a multifilament line, or a string.

Embodiment 9 is the tool of any one of embodiments 1-8, wherein the plurality of recesses comprise edges configured to scrape the outside of a cylindrical object.

Embodiment 10 is the tool of embodiment 9, wherein at least one of the edges is smooth.

Embodiment 11 is the tool of any one of embodiments 9-10, wherein at least one of the edges is coarse.

Embodiment 12 is the tool of any one of embodiments 1-11, wherein at least two of the plurality of recesses have different sizes.

Embodiment 13 is the tool of any one of embodiments 2-12, wherein:
   the plurality of recesses includes a semicircular shaped recess that is sized and shaped to accept an outer surface of a pipe or a rod; and
   the plurality of recesses includes a slot recess that is sized and shaped to accept an outer surface of a monofilament line, a multifilament line, or a string.

Embodiment 14 is the tool of embodiment 13, wherein:
   the pipe is a PVC pipe; and
   the first recess is shaped and sized to accept an outer surface of the PVC pipe.

Embodiment 15 is the tool of embodiment 13, wherein:
   the rod is a fiberglass rod; and
   the first recess is shaped and sized to accept an outer surface of the fiberglass rod.

Embodiment 16 is the tool of any one of embodiments 2-15, wherein at least one of the plurality of recesses is sized and shaped to accept a cylindrical object that is substantially or entirely underwater.

Embodiment 17 is the tool of any one of embodiments 2-16, wherein at least one of the plurality of recesses is sized and shaped to accept a cylindrical object that is part of a coral tree.

Embodiment 18 is the tool of any one of embodiments 1-17, comprising a handle.

Embodiment 19 is the tool of embodiment 18, wherein the handle and the body are one integrated piece.

Embodiment 20 is the tool of embodiment 18, wherein:
   the handle and the body are made from two or more separate pieces; and
   the handle is connected to the body.

Embodiment 21 is the tool of any one of embodiments 18-20, wherein the handle is positioned with respect to the body such that at least one of the plurality of recesses is on each side of the handle.

Embodiment 22 is the tool of embodiment 21, wherein:
   the handle is positioned parallel or substantially parallel to an axis that runs along the length of the body;
   the plurality of recesses includes a first set of one or more recesses that are located on a first end of the body in front of the handle; and
   the plurality of recesses includes a second set of one or more recesses that are located on a second end of the body behind the handle.

Embodiment 23 is the tool of any one of embodiments 1-22, comprising at least one cavity positioned within the body, wherein the cavity spans the height of the body and is configured to accept a loop.

Embodiment 24 is the tool of any one of embodiments 1-23, wherein the body comprises a resilient material.

Embodiment 25 is the tool of any one of embodiments 1-23, wherein the body comprises a water-resistant material.

Embodiment 26 is the tool of any one of embodiments 19-25, wherein the material is stainless steel, aluminum, or carbon fiber.

Embodiment 27 is the tool of any one of embodiments 1-26, wherein the outside of the body is treated with a water-resistant coating.

Embodiment 28 is the tool of any one of embodiments 2-27, wherein at least one of the plurality of recesses is configured to remove an amount of accumulated biofouling from an outer surface of the cylindrical object.

Embodiment 29 is the tool of embodiment 28, wherein at least one of the plurality of recesses is configured to remove substantially all of an accumulated biofouling from the outer surface of the cylindrical object.

Embodiment 30 is the tool of any one of embodiments 28-29, wherein the biofouling comprises algae, protozoa, bacteria, barnacles, fire coral, oysters, sponges, or hydroids.

Embodiment 31 is a method comprising cleaning an outer surface of a cylindrical object with the tool of any one of claims 1-30.

Embodiment 32 is the method of embodiment 31, wherein cleaning the outer surface of the cylindrical object with the tool of any one of claims 1-30 comprises:
   selecting one of the plurality of recesses sized and shaped to accept the outer surface of the cylindrical object;
   positioning one of the plurality of recesses such that it accepts an outer surface of the cylindrical object; and
   scraping the outer surface of the cylindrical object with an edge of one of the plurality of recesses;
   thereby removing an amount of an accumulated biofouling from the outer surface of the cylindrical object.

Embodiment 33 is the method of any one of embodiments 31-32, wherein the cylindrical object and the tool are substantially or entirely underwater.

Embodiment 34 is the method of any one of embodiments 31-33, wherein the cylindrical object is part of a coral tree.

Embodiment 35 is the method of any one of embodiments 31-34, wherein the cylindrical object is a pipe, a rod, a monofilament line, a multifilament line, or a string.

Embodiment 36 is the method of embodiment 35, wherein the pipe is a PVC pipe.

Embodiment 37 is the method of embodiment 35, wherein the rod is a fiberglass rod.

Embodiment 38 is the method of embodiment 35, wherein:
   the cylindrical object is a pipe or a rod; and
   the recess is a semicircular shaped recess.

Embodiment 39 is the method of embodiment 35, wherein:
   the cylindrical object is a monofilament line, a multifilament line, or a string; and
   the recess is a slot.

Embodiment 40 is the method of embodiment 35, comprising:
   cleaning, with a semicircular shaped recess of the tool, a pipe or a rod; and
   cleaning, with a slot recess of the tool, a monofilament line.

Embodiment 41 is the method of embodiment 40, wherein:
   cleaning, with the semicircular shaped recess of the tool, the pipe or the rod, removes an amount of an accumulated biofouling from the outer surface of the pipe or the rod; and
   cleaning, with the slot recess of the tool, the monofilament line, removes an amount of an accumulated biofouling from the outer surface of the monofilament line.

Embodiment 42 is the method of embodiment 40, wherein:
cleaning, with the semicircular shaped recess of the tool, the pipe or the rod, removes substantially all of an accumulated biofouling from the outer surface of the pipe or the rod; and
cleaning, with the slot recess of the tool, the monofilament line, removes substantially all of an accumulated biofouling from the outer surface of the monofilament line.

Embodiment 43 is the method of any one of embodiments 41-42, wherein the biofouling comprises algae, protozoa, bacteria, barnacles, fire coral, oysters, sponges, or hydroids.

Embodiment 44 is a tool for cleaning underwater structures, comprising:
a body, the body comprising:
a plurality of recesses positioned along at least one of a length and a width of the body,
wherein the plurality of recesses span a height of the body;
wherein the plurality of recesses are sized and shaped to accept an outer surface of a cylindrical object; and
wherein the plurality of recesses comprise edges configured to scrape the outside surface of the cylindrical object.

Embodiment 45 is the tool of embodiment 44, wherein at least one of the plurality of recesses is a recess that is semicircular shaped and sized to accept an outer surface of a pipe or a rod.

Embodiment 46 is the tool of embodiment 44, wherein at least one of the plurality of recesses is a slot that is sized and shaped to accept an outer surface of a monofilament line, a multifilament line, or a string.

Embodiment 47 is the tool of embodiment 46, wherein at least one of the plurality of recesses is a recess that is semicircular shaped and sized to accept an outer surface of a pipe or a rod.

Embodiment 48 is the tool of embodiment 47, wherein the slot is sized and shaped to accept an outer surface of a monofilament line.

Embodiment 49 is the tool of embodiment 47, wherein the pipe, the rod, the monofilament line, the multifilament line, or the string are part of a coral tree.

Embodiment 50 is the tool of embodiment 44, wherein at least one of the edges are smooth.

Embodiment 51 is the tool of embodiment 44, wherein at least one of the edges are coarse.

Embodiment 52 is the tool of embodiment 44, comprising at least two semicircular recesses of different sizes.

Embodiment 53 is the tool of embodiment 44, further comprising a handle.

Embodiment 54 is the tool of embodiment 53, wherein the handle and the body are one integrated piece.

Embodiment 55 is the tool of embodiment 53, wherein the handle is positioned with respect to the body such that at least one of the plurality of recesses is on each side of the handle.

Embodiment 56 is the tool of embodiment 55, wherein:
the handle is positioned parallel or substantially parallel to an axis that runs along the length of the body;
the plurality of recesses includes a first set of one or more recesses that are located on a first end of the body in front of the handle; and
the plurality of recesses includes a second set of one or more recesses that are located on a second end of the body behind the handle.

Embodiment 57 is the tool of embodiment 44, comprising at least one cavity positioned within the body, wherein the cavity spans the height of the body and is configured to accept a loop.

Embodiment 58 is the tool of embodiment 44, wherein the body comprises a resilient material or a water-resistant material.

Embodiment 59 is the tool of embodiment 58, wherein the material is stainless steel, aluminum, or carbon fiber.

Embodiment 60 is the tool of embodiment 44, wherein the outside of the body is treated with a water-resistant coating.

Embodiment 61 is a method of using an tool to clean an outer surface of a cylindrical object, the method comprising:
selecting a tool, the tool comprising:
a body;
a plurality of recesses formed in the body and positioned along at least one of a length and a width of the body, wherein:
at least one of the plurality of recesses spans a height of the body;
the plurality of recesses are sized and shaped to accept an outer surface of a cylindrical object; and
the plurality of recesses comprise edges configured to scrape an outer surface of a cylindrical object;
cleaning the outer surface of the cylindrical object while the cylindrical object and the tool are substantially or entirely underwater, wherein cleaning the outer surface comprises:
selecting the cylindrical object;
selecting one of the plurality of recesses of the tool sized and shaped to accept the outer surface of the cylindrical object;
positioning one of the plurality of recesses such that it accepts an outer surface of the cylindrical object; and
scraping the outer surface of the cylindrical object with an edge of one of the plurality of recesses to remove an amount of an accumulated biofouling from the outer surface of the cylindrical object.

Embodiment 62 is the method of embodiment 61, wherein:
the cylindrical object is a pipe or a rod; and
the recess is a semicircular shaped recess.

Embodiment 63 is the method of embodiment 61, wherein:
the cylindrical object is a monofilament line, a multifilament line, or a string; and
the recess is a slot.

Embodiment 64 is the method of embodiment 55, comprising:
cleaning, with a semicircular recess of the tool, a pipe or a rod; and
cleaning, with a slot of the tool, a monofilament line.

Particular embodiments of the invention have been described. Other embodiments are within the scope of the following claims. For example, the steps recited in the claims can be performed in a different order and still achieve desirable results. As one example, the processes depicted in the accompanying figures do not necessarily require the particular order shown, or sequential order, to achieve desirable results. In some cases, multitasking and parallel performance or processing may be advantageous.

What is claimed is:

1. A method of using a tool to clean an outer surface of a cylindrical object, the method comprising:
selecting a tool configured to clean a plurality of cylindrical objects having different diameters, the tool comprising:

a body having a top surface and a bottom surface, wherein:
  at least a portion of the top surface is planar;
  at least a portion of the bottom surface is planar; and
  the at least portion of the top surface is substantially parallel to the at least portion of the bottom surface;
a plurality of open-ended recesses formed in the body and positioned along at least one of a length and a width of the body, wherein:
  a first recess of the plurality of open-ended recesses is formed in the body and positioned along the width of the body such that (i) a major axis of the tool that runs the length of the body intersects the first recess as a line of symmetry for the first recess or (ii) a line substantially parallel to the major axis intersects the first recess as a line of symmetry for the first recess;
  a second recess of the plurality of open-ended recesses is formed in the body and positioned along the length of the body such that (i) a minor axis of the tool that runs the width of the body and is perpendicular to the major axis intersects the second recess as a line of symmetry for the second recess or (ii) a line substantially parallel to the minor axis intersects the second recess as a line of symmetry for the second recess;
  at least one of the plurality of open-ended recesses spans a height of the body such that the at least one of the plurality of open-ended recesses intersects the top surface of the body and the bottom surface of the body;
  the plurality of open-ended recesses are sized and shaped to accept outer surfaces of the cylindrical objects; and
  each of the plurality of open-ended recesses comprise at least one edge, wherein the at least one edge is configured to contact an outer surface of a cylindrical object and used to scrape the outer surface of the cylindrical object to remove biofouling; and
cleaning an outer surface of a first cylindrical object of the plurality of cylindrical objects while the first cylindrical object and the tool are substantially or entirely underwater, wherein cleaning the outer surface of the first cylindrical object comprises:
  selecting the first cylindrical object having a first diameter to clean with the tool;
  identifying one of the plurality of open-ended recesses formed in the body of the tool that is sized and shaped to accept the outer surface of the first cylindrical object having the first diameter;
  positioning the tool to place a portion of the outer surface of the first cylindrical object having the first diameter into the identified open-ended recess; and
  scraping the outer surface of the first cylindrical object having the first diameter with an edge of the open-ended recess to remove an amount of biofouling that accumulated on the outer surface of the first cylindrical object having the first diameter.

2. The method of claim 1, wherein:
selecting the tool configured to clean the plurality of cylindrical objects comprises selecting the tool comprising:
  the body, wherein the body has a first section, a second section positioned opposite the first section, and a third section positioned between the first section and the second section; and
  the plurality of open-ended recesses formed in the body, wherein the plurality of open-ended recesses are formed only in the first section and/or the second section of the body;
identifying one of the plurality of open-ended recesses formed in the body of the tool comprises identifying a single open-ended recess formed in either the first section or the second section of the body;
positioning the tool comprises positioning the tool to place a portion of the outer surface of the cylindrical object into the single open-ended recess formed in either the first section or the second section of the body; and
scraping the outer surface of the cylindrical object comprises scraping the outer surface of the cylindrical object with an edge of the single open-ended recess.

3. The method of claim 1, wherein:
the plurality of open-ended recesses comprise a plurality of open-ended recesses having different sizes, including a first size and a second size smaller than the first size; and
identifying one of the plurality of open-ended recesses comprises selecting an open-ended recess having the first size over an open-ended recess having the second size, wherein the open-ended recess having the first size is sufficiently sized to accept the outer surface of the first cylindrical object having the first diameter.

4. The method of claim 1, wherein the plurality of open-ended recesses comprise a plurality of semicircular-shaped recesses.

5. The method of claim 1, wherein selecting the tool configured to clean the plurality of cylindrical objects comprises selecting a tool comprising the body having the top surface and the bottom surface, wherein the top surface is substantially parallel to the bottom surface such that the body has a substantially uniform height.

6. The method of claim 1, wherein selecting the tool configured to clean the plurality of cylindrical objects comprises selecting the tool comprising the plurality of open-ended recesses formed in the body and positioned along at least one of a length and a width of the body, wherein each of the plurality of open-ended recesses has a substantially uniform size and shape that spans a height of the body, such that each of the plurality of open-ended recesses (i) intersects the top surface of the body and the bottom surface of the body and (ii) has substantially the same dimensions at the top surface of the body as at the bottom surface of the body.

7. The method of claim 2, wherein:
positioning the tool comprises using the third section of the body of the tool to manipulate a position of the tool; and
scraping the outer surface of the cylindrical object with the edge of the single recess comprises applying a force through the third section of the body of the tool.

8. The method of claim 3, comprising:
after cleaning the outer surface of the first cylindrical object, cleaning an outer surface of a second cylindrical object of the plurality of cylindrical objects while the second cylindrical object and the tool are substantially or entirely underwater, wherein cleaning the outer surface of the second cylindrical object comprises:

selecting the second cylindrical object having a second diameter smaller than the first diameter to clean with the tool;

selecting an open-ended recess having the second size over an open-ended recess having the first size, wherein the open-ended recess having the second size is sufficiently sized to accept the outer surface of the second cylindrical object having the second diameter;

positioning the tool to place a portion of the outer surface of the second cylindrical object having the second diameter into the selected open-ended recess; and scraping the outer surface of the second cylindrical object having the second diameter with an edge of the selected open-ended recess to remove an amount of biofouling that accumulated on the outer surface of the second cylindrical object.

9. The method of claim 4, wherein:

the plurality of semicircular-shaped recesses have different radii, including a first radius and a second radius smaller than the first radius; and identifying one of the plurality of open-ended recesses comprises selecting a semicircular-shaped recess having the first radius over a semicircular-shaped recess having the second radius, wherein the semicircular-shaped recess having the first radius is sufficiently sized to accept the outer surface of the first cylindrical object having the first diameter.

10. The method of claim 9, comprising:

after cleaning the outer surface of the first cylindrical object, cleaning an outer surface of a second cylindrical object of the plurality of cylindrical objects while the second cylindrical object and the tool are substantially or entirely underwater, wherein cleaning the outer surface of the second cylindrical object comprises:

selecting the second cylindrical object having a second diameter smaller than the first diameter to clean with the tool;

selecting a semicircular-shaped recess having the second radius over a semicircular-shaped recess having the first radius, wherein the semicircular-shaped recess having the second radius is sufficiently sized to accept the outer surface of the second cylindrical object having the second diameter;

positioning the tool to place a portion of the outer surface of the second cylindrical object having the second diameter into the selected semicircular-shaped recess; and scraping the outer surface of the second cylindrical object having the second diameter with an edge of the selected semicircular-shaped recess to remove an amount of biofouling that accumulated on the outer surface of the second cylindrical object.

* * * * *